UNITED STATES PATENT OFFICE.

THOMAS JAMES, OF MEDFORD, MASSACHUSETTS, ASSIGNOR TO HIMSELF, JOHN McCRELLISH, JOHN ROGERS, W. H. JAMES, AND C. H. WHITE, OF SAME PLACE; AND SAID PARTIES ASSIGN THEIR RIGHT TO THOMAS JAMES, JOHN McCRELLISH, AND CHAS. H. WHITE.

IMPROVED BLACKING FOR LEATHER, HARNESS, &c.

Specification forming part of Letters Patent No. 55,203, dated May 29, 1866.

*To all whom it may concern:*

Be it known that I, THOMAS JAMES, of Medford, in the county of Middlesex and State of Massachusetts, have invented an Improved Oil-Blacking for Leather, Harness, &c.; and I hereby declare the following to be a full, clear, and exact description thereof.

This invention has for its object to produce an oil-blacking for leather by which it is rendered soft and pliable, while a uniform smooth and bright finish is given to its surface, which is not easily defaced by handling.

To enable others skilled in the art to understand and use my invention, I will proceed to describe the manner in which I have carried it out.

Take two pounds of ground logwood, one pound of "cutch," and one pound of the extract of hemlock-bark and boil them together in two quarts of water for about half an hour; then add two pounds of copperas, which is dissolved in the mixture. The whole is then filtered through sand or other suitable substance. This forms the coloring-matter for blacking the leather. I then heat in a suitable vessel two quarts of neat's-foot oil until it boils, and then add one gill of japan, which serves as a drier to prevent the blacking from smutting or rubbing off, and also gives a smooth and bright finish to the leather. Some other suitable drying substance, however, may be used instead; but in practice I have found the japan best suited for the purpose.

The two compounds above described are then mixed together and heated, and when nearly cool half a pint of alcohol is added, and the whole stirred briskly and thoroughly incorporated together, the alcohol serving to prevent the separation of the ingredients.

The proportions of the above-named ingredients may be slightly varied without departing from the spirit of my invention. Those above mentioned, however, I have found to answer well.

The oil-blacking thus produced contains no substance injurious to the leather, while it renders it extremely soft and pliable, and imparts a uniform smooth and bright finish to its surface, which will not smut or grease in handling.

What I claim as my invention, and desire to secure by Letters Patent, is—

The within-described oil-blacking for leather, composed of the materials specified mixed in the proportions substantially as set forth.

THOMAS JAMES.

Witnesses:
P. E. TESCHEMACHER,
GEORGE NICHOLS.